Figure 1:
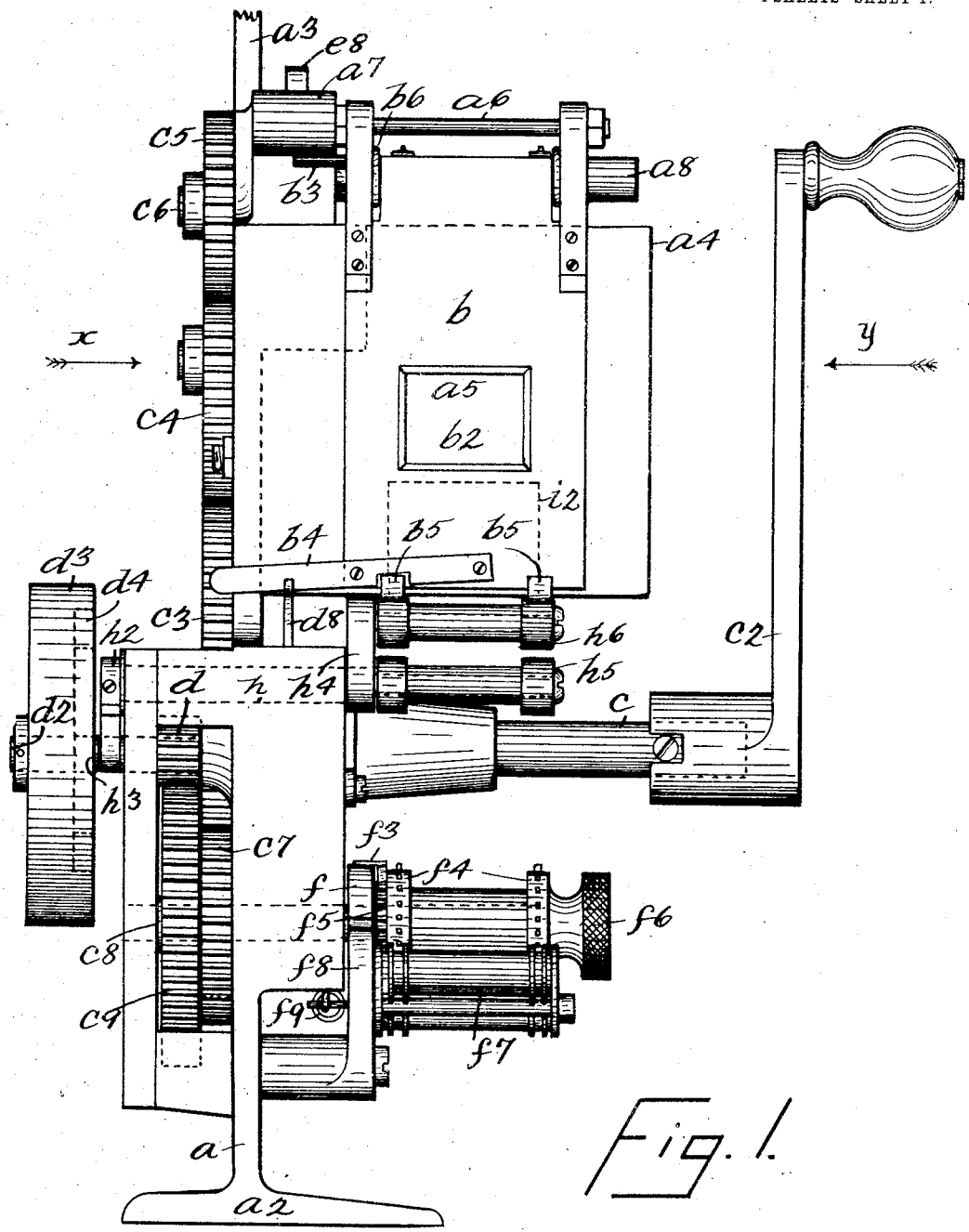

G. W. BINGHAM.
KINETOSCOPE.
APPLICATION FILED MAY 25, 1908.
960,794.
Patented June 7, 1910.
4 SHEETS—SHEET 4.
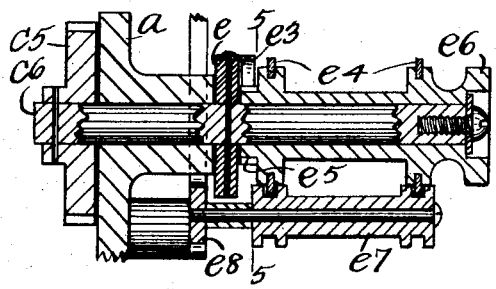
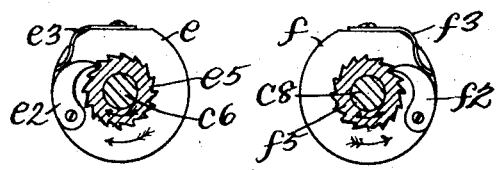
Fig. 4. Fig. 5. Fig. 6.
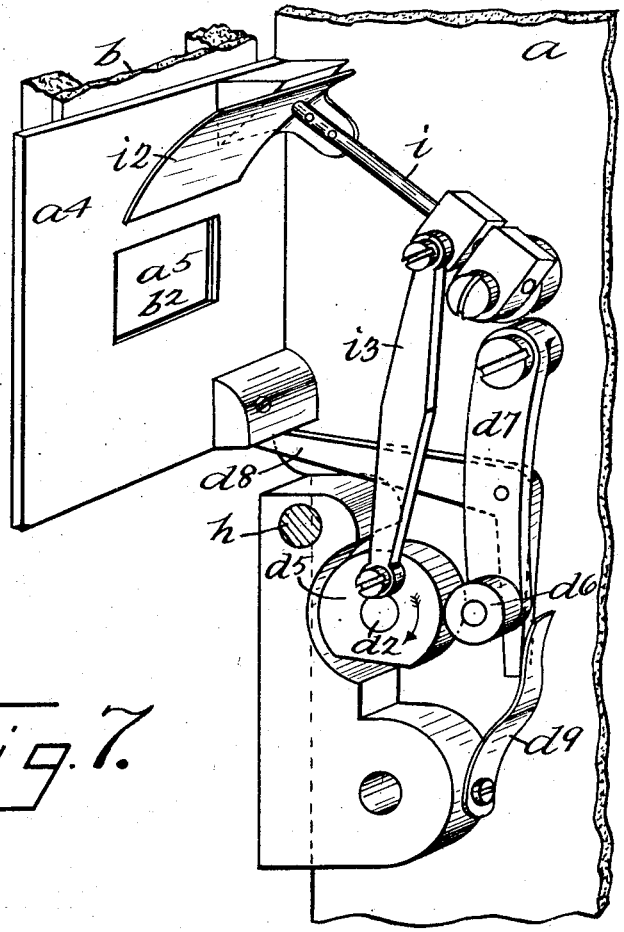
Fig. 7.
Witnesses:
George F. Bentley
J. C. Larsen
Inventor
George W. Bingham
By Attorney J. Chris Larsen

UNITED STATES PATENT OFFICE.

GEORGE W. BINGHAM, OF BROOKLYN, NEW YORK, ASSIGNOR TO THE BINGHAM MANUFACTURING COMPANY, A CORPORATION OF MAINE.

KINETOSCOPE.

960,794.   Specification of Letters Patent.   Patented June 7, 1910.

Application filed May 25, 1908. Serial No. 434,908.

*To all whom it may concern:*

Be it known that I, GEORGE W. BINGHAM, a citizen of the United States of America, and residing at Brooklyn, in the county of Kings and State of New York, have invented certain new and useful Improvements in Kinetoscopes, of which the following is a specification, such as will enable those skilled in the art to which it appertains to make and use the same.

The present invention relates generally to moving picture machines, and has more particularly reference to the film advancing means and their relation to the shutter.

The objects of the invention are to properly control the film so as to insure proper registry with the exposure opening, to permit of easy framing of the picture, and to reduce the flicker due to the intermittent shifting of the film.

In carrying out the above objects, the invention comprises the following: Two rotary film feeding devices, such as sprockets, are employed. One of these sprockets is located above and the other below the exposure opening. These sprockets are driven continuously at the same speed by suitable gearing. Interposed between the two sprockets is a device for intermittently advancing the film past the exposure opening. The upper sprocket acts as a continuous slack producing device, and the lower sprocket as a continuous take-up device. In order to frame the picture or to decrease the size of the loop, the lower sprocket is rotatable independently of its normal rotation and independently of the upper sprocket. And, in order to provide sufficient slack to permit the lower sprocket to frame the picture, the upper sprocket is likewise independently rotatable at will. In connection with the above is employed an intermittent clamping device for clamping the exposed portion of the film. This clamping device is here shown as being interposed between the upper sprocket and the means for intermittently advancing the film.

In combination with the above is further employed a reciprocating shutter which moves past the exposure opening twice to each cycle of the machine. One of these movements takes place during the downward stroke of the intermittent film advancing means and when the clamp is off, while the other movement takes place when the film is standing still and the clamp is on. By subdividing the movement of the shutter in this fashion, the objectionable flicker is avoided or reduced.

Other features of construction will appear as the specification proceeds.

In the accompanying drawings there is illustrated a preferred embodiment of my invention, but it will be understood that various changes and modifications may be made therein, without departing from the scope and spirit of the invention.

Figure 2:
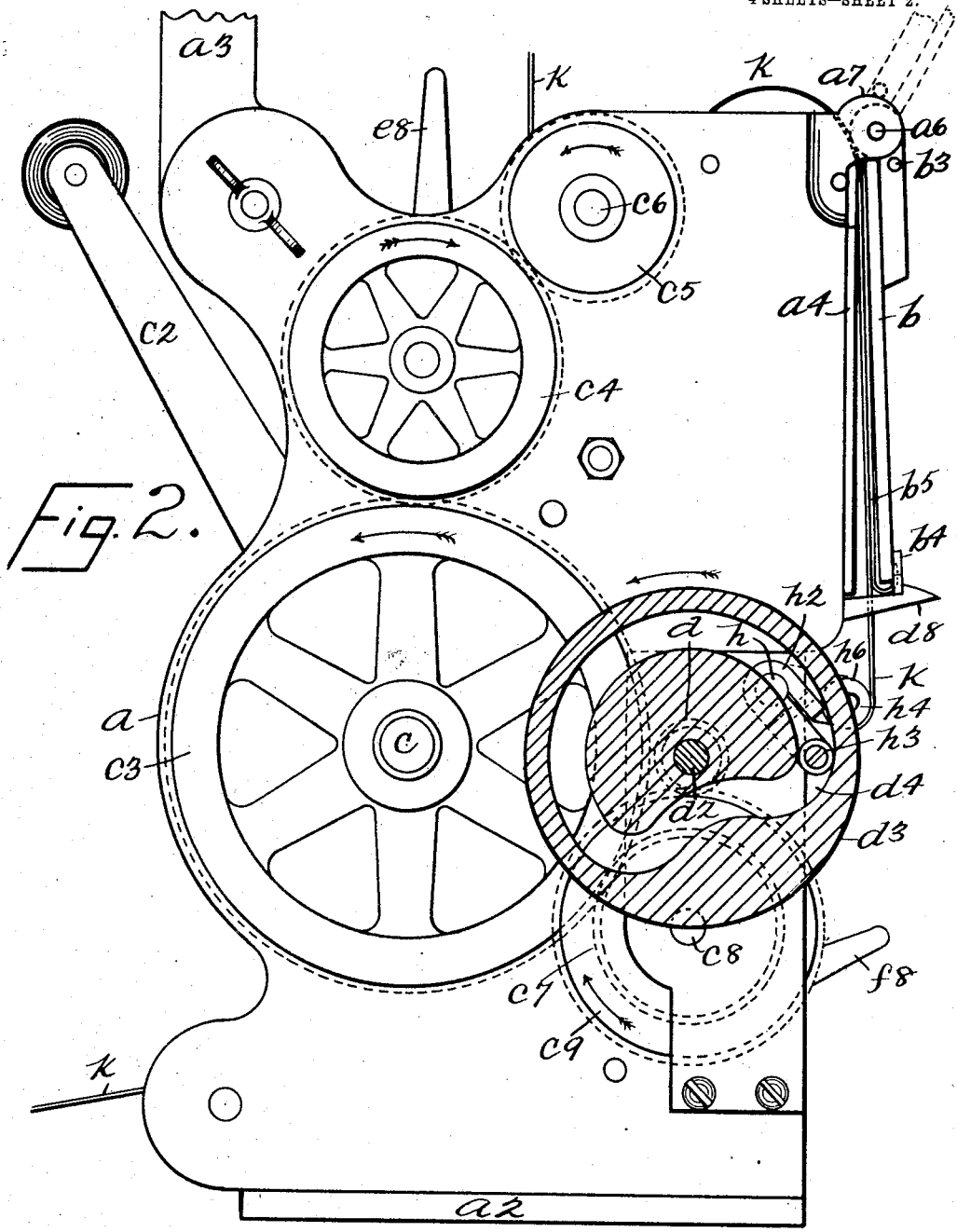
Figure 3:
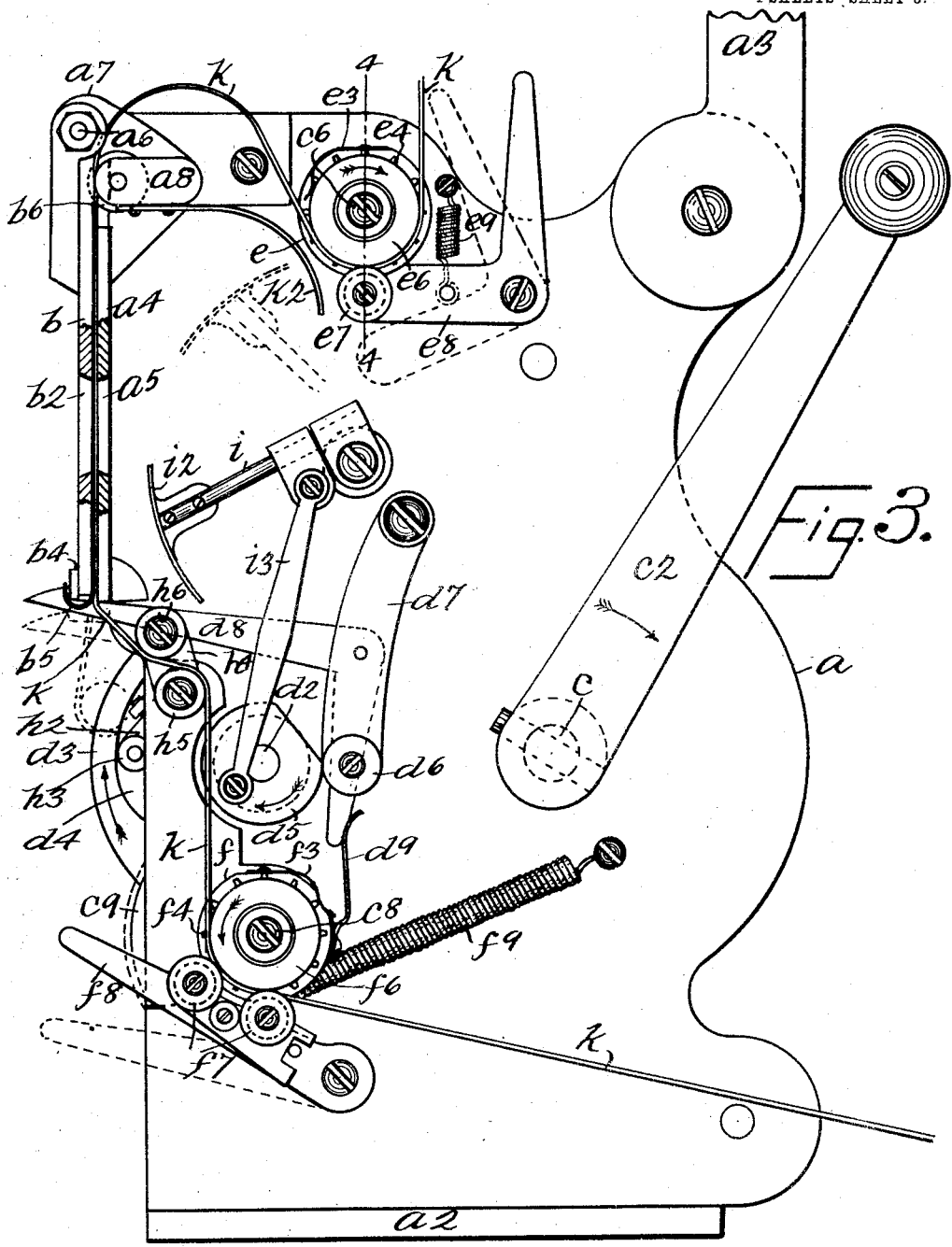

In the drawings: Figure 1 is a rear view of a preferred embodiment of the invention. Fig. 2 is a side elevation of the left hand side of the machine looking in the direction of the arrow X in Fig. 1, and showing the film advancing cam in section. Fig. 3 is a similar view of the other side of the machine, looking in the direction of the arrow $y$ in Fig. 1. Fig. 4 is a sectional view of the upper film advancing sprocket taken on the line 4—4 of Fig. 3. Fig. 5 is a cross sectional view of the same, taken on the line 5—5 of Fig. 4. Fig. 6 is a like view of the lower film advancing sprocket. Fig. 7 is a fragmentary view in perspective of the shutter operating mechanism and the film clamp and releasing means.

In the accompanying drawings similar reference characters denote like parts throughout the several views.

The letter $a$ denotes the frame of the machine, which may be carried on a suitable base $a^2$. Pivoted to the frame there may be provided an adjustable bracket arm $a^3$ for the support of a holder for the roll or unused portion of the film. The film $k$ after leaving the holder or support therefor, passes partially around a slack forming device, here shown in the shape of a film sprocket $e^4$, thence over the guide roll $b^6$ or other guiding means, located at the top of the plate or member $a^4$. The film is held in proper engagement with the sprocket or other feeding device by suitable means, such as the roll $e^7$ journaled in the pivoted bracket $c^8$. The spring $e^9$ holds this roll in yielding engagement with the sprocket and permits displacement of the roll to allow the insertion of the film around the sprocket. The member $a^4$ is provided with a window or exposure opening $a^5$ therein, and coöperating with the said window member there is preferably provided a door $b$ which guides the film across the face of the window member and may be used to hold and clamp the film during the exposure thereof. This so-called clamping member is also provided with an exposure opening $b^2$ in registry with the exposure opening in the window member. The clamping member is supported so as to have a movement toward and away from the window member and for this reason it may be pivotally hung from a pair of hinge lugs located at the top or near the upper end of the window member. In this connection I also preferably provide means for holding the door in its uppermost or open position. These means may consist of a pin or projection $b^3$ on the door, which, when the door is open, is adapted to make a frictional or binding engagement with the surface $a^7$ of the hinge lug or lugs; this surface being eccentric to the center $a^6$ of pivotal support for the door, so that when, as illustrated in Fig. 2, the door is thrown open, the projection or projections, as the case may be, on the door will engage with the eccentric locking surface on the hinge lugs.

The door may be operated to serve as a clamp by any suitable means. In the present instance, these means consist of a hook member $d^3$ adapted to engage a part $b^4$ on the lower edge of the door, and pull the door closed against the tension of a suitable spring or springs $b^5$. This clamp is preferably operated to hold the film during exposure periods and to release the pressure on the film during the intermittent advancing movements of such film. This result may conveniently be accomplished by means of a cam $d^5$ fixed on the inner end of the shaft $d^2$, the cam engaging a cam roll $d^6$ on the lower end of the swinging lever $d^7$, to which the hook is pivotally secured, as plainly shown in Fig. 3. This cam is provided with a concentric portion, substantially as shown, of comparatively great duration, which acts upon the cam roll to hold the gate closed during the greater portion of the revolution of the cam and with a recessed or substantially flattened portion, which, when in engagement with the cam roll, permits the lever $d^7$ and the hook carried thereby to be pushed outward by the spring $d^9$ to release the pressure of the clamping member. As shown in Fig. 3, the cam roll is just about to enter upon the recessed portion of the cam for the purpose of relieving the pressure of the clamping member.

Below the exposure opening there is located a second film feeding device, which, as in the case of the first feeding device, may consist of a constantly rotating film sprocket $f^4$. The film may be held in proper engagement with the second film feeding by means of a pair of rollers $f^7$ journaled in a pivoted bracket $f^8$, which rollers are held in yielding engagement with the film roll by means of a spring $f^9$.

Interposed at a point between the upper and lower film feeding devices there is an intermittently operated film advancing device. This intermittent film advancing means may and preferably does consist of a film advancing roll $h^6$ carried by a rocker arm $h^4$ on the inner end of a shaft $h$, and fixed upon the opposite end of said shaft there is a crank arm $h^2$ carrying a cam roll $h^3$ for engagement with the cam groove $d^4$ in the member $d^3$. This cam member may be in the form of a balance wheel, as shown, mounted upon the outer end of the cam shaft $d^2$. Associated with the movable film advancing roll is a relatively stationary guide roll $h^5$ which, as indicated in Fig. 1, may be loosely engaged upon the inner end of the shaft $h$. The cam groove imparts to the shaft $h$ and the film advancing roll carried thereby, an oscillatory up and down movement, as indicated in dotted lines Fig. 3, and upon each downward stroke of the film advancing roll the film is advanced past the exposure opening an amount substantially equal to the stroke of the advancing roll. The pressure of the clamping device is preferably released during this downward stroke of the film advancing roll so that there shall be no undue wear on the film. The lower film take-up device, which is here shown in the form of the sprocket $f^4$, is so timed as to wind up the film advanced by the film advancing means and to hold the film substantially taut during the downward stroke of the film advancing roll.

A shutter of any approved type may be used in my machine, or if found unnecessary, the shutter may be dispensed with entirely. I prefer, however, to employ in this connection a shutter of improved construction and which is particularly adapted for use in this machine. As illustrated, this shutter consists of a shutter blade $i^2$ carried by an arm $i$ pivoted on a center at right angles to the axis of the exposure opening. The shutter is oscillated back and forth past the exposure opening preferably by means of a link $i^3$ connected with the cam disk $d^5$. The shutter is so timed as to move downward (from the dotted position in Fig. 3) with, and substantially at the same speed as the film, during its intermittent advancing movement. The film and shutter thus preferably move downward at the same, at substantially the same speed, so as to reduce the objectionable flicker ordinarily incidental to the closing of the shutter, and in order to still further reduce this flicker, the shutter is again moved past the exposure opening, during the interval of time in which the film is stationary and being exposed. In the present instance, the shutter moves down with the film, then up once past the exposure opening while the picture is being exposed, thus dividing each exposure up into a series of two flashes. If found desirable, however, the shutter could be timed to divide up each exposure into a series of more than two flashes. It has proven in actual work that the practice of dividing each exposure into a series of flashes obviates or reduces to a very large extent the objectionable flickering usually caused by the intermittent advancing movement of the film and the operation of the machine.

In order to insure perfect registry of the pictures with the exposure opening, the take-up device, which is usually in the form of a sprocket, as shown, is preferably made adjustable independently of the means for rotating the same. This result may be accomplished by making the sprocket freely rotatable upon the sprocket shaft $c^3$, and in providing an adjustable connection between the sprocket and its shaft, such as the ratchet $f^5$ on the sprocket, adapted to be engaged by the pawl $f^2$ carried by the fixed driving member or disk $f$ on the sprocket shaft. The pawl is held in engagement with the ratchet, as by means of a spring $f^3$. These various parts are clearly shown in Figs. 1, 3 and 6. The sprocket is provided with a head or handhold $f^6$ by means of which it may be turned independently on the shaft. It will be obvious from an inspection of Fig. 3 that when the sprocket is rotated in the direction of the arrow, the film may be advanced any desired amount to frame the pictures thereon with respect to the exposure opening.

In order to permit of the intermittent advancing movement of the film, a certain amount of slack must be provided between the film advancing means and the upper film feeding device or sprocket. The location of the slack in the body of the film is clearly illustrated in Figs. 2 and 3. The upper film feeding device and the lower take-up device operate at substantially the same speed. If, therefore, the take-up device is advanced by hand to pull down the film for the purpose of framing or otherwise, the amount of slack above the film advancing means is reduced more or less. For the successful operation of the machine, therefore, it then becomes necessary to pay out at the top, or in advance of the film advancing means, an additional amount of film, substantially equal to that taken up by the adjustment of the take-up device, so as to preserve a proper amount of slack above the film advancing means. For this reason I therefore prefer to also make the upper film feeding device or sprocket adjustable independently of the means for normally rotating the same. This is done preferably in the same way as in the case of the take-up device, that is, as shown in Figs. 4 and 5, by mounting the sprocket loose upon the sprocket shaft $c^6$ and in providing a pawl $e^2$ carried by the fixed driving member $e$ and forced into active engagement with the ratchet $e^5$ on the sprocket, by means of a spring $e^3$. Thus, after the lower sprocket or take-up device is adjusted for the purpose of framing the picture, the upper sprocket may be adjusted by means of the head $e^6$ on the end thereof to provide a sufficient amount of slack above the film advancing means.

The machine may be operated by power or manually and in the latter case, there would preferably be engaged upon the main drive shaft $c$, an operating crank $c^2$. Motion is transmitted to the various parts by a suitable train of gearing. In the present instance this gearing consists of a main gear $c^3$ meshing with an intermediate gear $c^4$, which imparts rotation to a gear $c^5$ on the upper sprocket shaft $c^6$; a gear $c^7$ on the lower sprocket shaft in mesh with the main drive gear, for rotating the lower sprocket; and a gear $c^8$ fixed with respect to the gear $c^7$, and itself meshing with a pinion $d$ on the cam shaft $d^2$. In order to prevent the slack portion of film from falling down to a point where it may be struck by the oscillating shutter, and in order to protect it against any possible injury, I may provide a guard member $k^2$, located between the window member and the upper sprocket.

It will be understood that the invention as a whole, and the various features thereof, may be applied equally as well to the camera for taking the pictures as to the projecting apparatus for displaying the same.

What is claimed, is:

1. In a moving picture machine having an exposure opening, a reciprocating device for intermittently advancing the film, a clamp adapted to clamp the film on the up stroke of the film advancing device and to release it on the down stroke of the film advancing device, a reciprocating shutter, and means for moving said shutter past the exposure opening twice to each cycle of the machine, one of said movements taking place during the downward stroke of the film advancing means.

2. In a moving picture machine, a plate having an exposure opening therein, a movable clamping member associated therewith, a pivoted lever, a hook carried thereby in engagement with the movable clamping member, a tension spring connected with the said hook, a cam roll on the lever, a cam adapted for engagement with said cam roll, a pivoted shutter arm and a shutter carried thereby, and a crank connection between said shutter arm and the cam.

3. In a moving picture machine, a plate having an exposure opening therein, a movable clamping member associated therewith, means for intermittently advancing the film past the exposure opening, a pivoted lever, a hook carried thereby in engagement with the movable clamping member, a tension spring connected with the said hook, a cam roll on the lever, a cam adapted for engagement with said cam roll, a pivoted shutter arm and a shutter carried thereby, and a crank connection between said shutter arm and the cam.

4. In a moving picture machine, a plate having an exposure opening therein, a movable clamping member associated therewith, a pivoted lever, a hook carried thereby engaging the movable clamping member, a spring acting on the hook, a cam roll on the lever, and a cam adapted for engagement with said cam roll to force the hook over to hold the clamping member in clamping engagement with the aforesaid plate.

5. In a moving picture machine provided with an exposure opening, a clamp for holding the film during exposure periods, a cam for operating said clamp, a pivoted shutter arm and a shutter carried thereby, and a crank connection between said shutter arm and the cam.

In testimony that I claim the foregoing as my invention I have signed my name in presence of the subscribing witnesses this 20th day of May 1908.

GEORGE W. BINGHAM.

Witnesses:
GEORGE F. BENTLEY,
J. C. LARSEN.